No. 857,095. PATENTED JUNE 18, 1907.
T. F. & L. C. McCARTY.
CLOD FENDER ADJUSTER.
APPLICATION FILED NOV. 15, 1906.
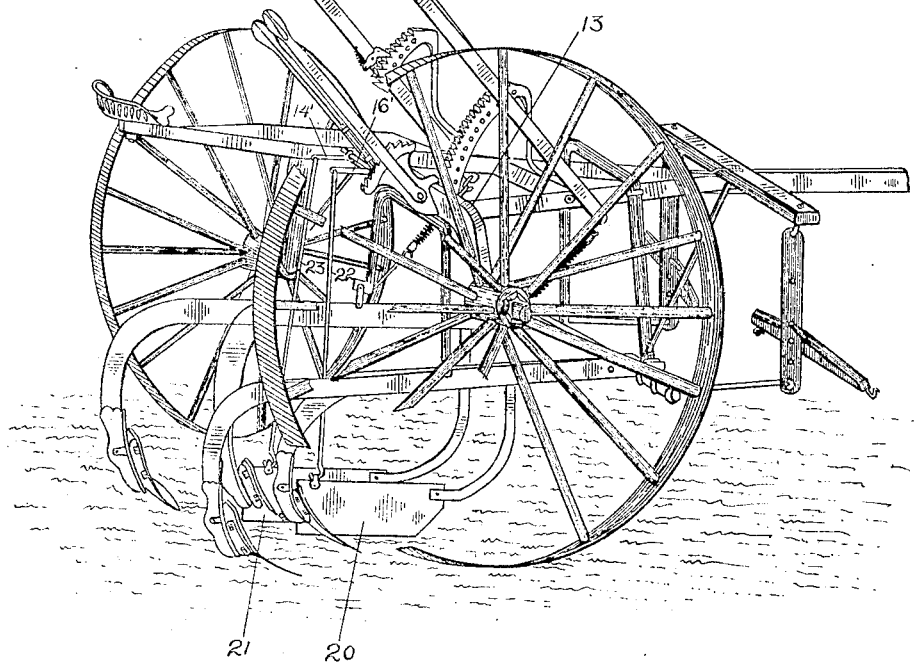
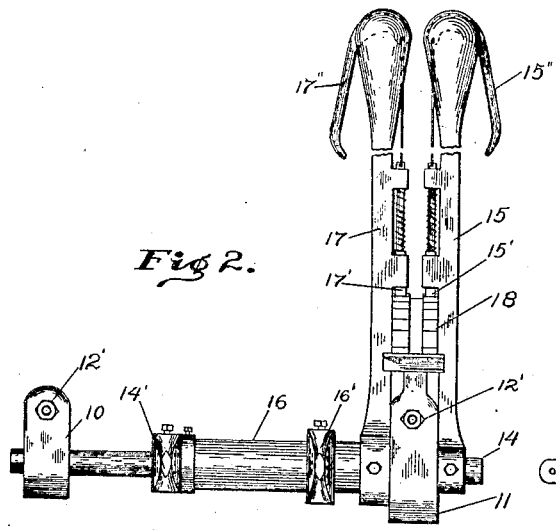
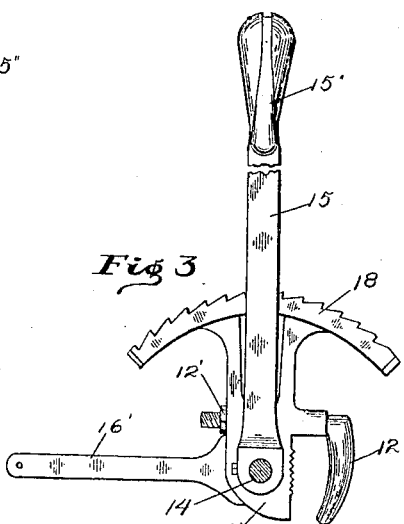
Witnesses
K. R. Clendening.
Thomas W. McMeans.
Inventors
Thomas F. McCarty.
Lewis C. McCarty.
By Bradford Hood.
Attorneys

UNITED STATES PATENT OFFICE.

THOMAS F. McCARTY AND LEWIS C. McCARTY, OF FALL CREEK TOWNSHIP, HAMILTON COUNTY, INDIANA.

CLOD-FENDER ADJUSTER.

No. 857,095.      Specification of Letters Patent.      Patented June 18, 1907.

Application filed November 15, 1906. Serial No. 343,626.

*To all whom it may concern:*

Be it known that we, THOMAS F. MCCARTY and LEWIS C. MCCARTY, citizens of the United States, residing at Fall Creek township, in the county of Hamilton and State of Indiana, have invented certain new and useful Improvements in Clod-Fender Adjusters, of which the following is a specification.

In the cultivation of corn, and other similar crops, it is desirable to cover, as completely as possible, the weeds and in order to do this it is found that it is more effective to cover the high weeds from one side, thus breaking the stalks and laying them flat on the ground and covering with clods.

The object of our present invention is, therefore, to provide means for readily controlling the clod fenders of a cultivator so that they may be independently or simultaneously operated with one hand.

A further object of our invention is to embody our apparatus in the form of an attachment which may be readily attached to any cultivator.

The accompanying drawing illustrates our invention:

Figure 1 is a perspective view of a standard cultivator equipped with our improvement; Fig. 2 a side elevation of the attachment, and Fig. 3 an end elevation.

In the drawings, 10 and 11 indicate a pair of clamps each having a clamping finger 12 having a threaded end carrying a nut 12' by means of which it may be clamped upon the axle 13 of a cultivator. Journaled in the two clamps 10 and 11 is a rock-shaft 14 to the end of which, adjacent clamp 11, is an operating lever 15. Journaled on shaft 14, between the two clamps, is a sleeve 16 to which is secured an operating lever 17. Levers 15 and 17 lie closely adjacent the clamp 11, on opposite sides thereof and said clamp carries a segmental ratchet 18 adapted to receive detents 15' and 17' of the levers 15 and 17 respectively. The detents are operated by levers 15'' and 17'' carried by the levers 15 and 17 respectively. In order that both levers 15 and 17 may be operated simultaneously I arrange the levers 15'' and 17'' on opposite sides thereof so that the operator, by grasping both levers in one hand, may simultaneously withdraw both detents.

Secured to shaft 14 is an arm 14' and secured to sleeve 16 is a similar arm 16', said arms being secured by means—such as a set screw—which will permit adjustment thereof. Movably mounted on the frame of the cultivator, in any desired manner, are the clod fenders 20 and 21 and these are connected by links 22 and 23 with the arms 16' and 14' respectively.

In operation, either fender may be independently raised or lowered by manipulating the proper lever 15 or 17 respectively, or they may be simultaneously raised or lowered by grasping both levers in one hand.

We claim as our invention:

1. The combination with a cultivator, and the clod fenders thereof, of a pair of operating levers connected respectively to said fenders, means for holding said levers in desired position of adjustment, said levers having portions arranged closely adjacent and carrying means for releasing the levers, whereby said levers may be simultaneously released and operated by one hand.

2. An attachment for cultivators comprising a pair of closely adjacent levers, a segment, detents carried by said levers and adapted to engage said segment, means carried by the levers for operating the detents, said means being arranged to be grasped simultaneously in one hand, and means for connecting the levers to clod fenders of a cultivator.

3. An attachment for cultivators comprising a rock-shaft, means for attaching said shaft to a cultivator, a sleeve journaled on the shaft, a pair of adjacent levers, one carried by the shaft and the other by the sleeve, detents for holding said levers, detent-operating means carried by the levers in position to be simultaneously operated by one hand, and arms carried by the shaft and sleeve for connection with clod fenders of a cultivator.

In witness whereof, we have hereunto set our hands and seals at Indianapolis, Indiana, this 9th day of November, A. D. one thousand nine hundred and six.

THOMAS F. McCARTY. [L. S.]
    LEWIS C. McCARTY. [L. S.]

Witnesses:
    MAMIE CASSELL,
    THOMAS W. McMEANS.